(12) United States Patent
Weisweiler

(10) Patent No.: US 6,399,034 B1
(45) Date of Patent: Jun. 4, 2002

(54) PROCESS FOR REDUCING NITROGEN OXIDES ON SCR CATALYST

(75) Inventor: Werner Weisweiler, Remchingen (DE)

(73) Assignee: HJS Fahrzeugtechnik GmbH & Co., Menden (DE)

(*) Notice: Subject to any disclaimer, the term of this patent is extended or adjusted under 35 U.S.C. 154(b) by 0 days.

(21) Appl. No.: 09/423,682

(22) PCT Filed: May 8, 1997

(86) PCT No.: PCT/EP98/02697

§ 371 (c)(1),
(2), (4) Date: Jan. 27, 2000

(87) PCT Pub. No.: WO98/51402

PCT Pub. Date: Nov. 19, 1998

(30) Foreign Application Priority Data

May 14, 1997 (DE) .......................... 197 20 209

(51) Int. Cl.$^7$ .......................... B01D 53/54; B01D 53/60
(52) U.S. Cl. .......................... 423/213.2; 60/274; 60/286; 60/295; 423/239.1
(58) Field of Search .......................... 423/212, 239.1, 423/213.2, 356, 352; 422/111, 168, 177; 60/274, 286, 295, 301

(56) References Cited

U.S. PATENT DOCUMENTS

| | | | |
|---|---|---|---|
| 4,854,123 A | * | 8/1989 | Inoue .......................... 60/274 |
| 5,021,227 A | * | 6/1991 | Kobayashi et al. .......... 423/212 |
| 5,116,579 A | * | 5/1992 | Kobayashi et al. .......... 422/111 |
| 5,809,975 A | | 9/1998 | Tarabulski et al. ............ 60/274 |
| 6,082,102 A | * | 7/2000 | Wissler et al. ................ 60/286 |

FOREIGN PATENT DOCUMENTS

| | | |
|---|---|---|
| DE | 3422175 A1 | 12/1985 |
| EP | 0277765 A1 | 8/1988 |
| EP | 0381236 A1 | 8/1990 |
| EP | 0615777 A1 | 9/1994 |
| EP | 0617199 A1 | 9/1994 |
| JP | 02258017 A | 10/1990 |
| JP | 08057258 | 3/1996 |

* cited by examiner

Primary Examiner—Steven P. Griffin
Assistant Examiner—Maribel Medina-Sanabna
(74) Attorney, Agent, or Firm—Flanagan & Flanagan; John R. Flanagan

(57) ABSTRACT

A process for reducing nitrogen oxides on a SCR catalyst disposed in an exhaust gas system of an internal combustion engine is performed by a device adapted to introduce ammonia ($NH_3$) into the exhaust gas flow of the exhaust gas system before it reaches the SCR catalyst. The device includes a heatable pressure-tight converter, an $NH_3$ store and a control unit with control signals processing engine operating characteristics and determining therefrom the $NO_x$ output for controlling a timed valve for injection of an $NH_3$ dose.

9 Claims, 3 Drawing Sheets

PROCESS FOR REDUCING NITROGEN OXIDES ON SCR CATALYST

BACKGROUND OF THE INVENTION

The invention relates to the field of reducing primary injurious substances generated in internal combustion engines by means of a catalyst. The invention relates, in particular, to a process for reducing nitrogen oxides ($NO_x$) on a SCR catalyst, disposed in the exhaust gas system of an internal combustion engine, with ammonia ($NH_3$) which is preferably introduced into the exhaust gas flow before the catalyst. The invention further relates to a device for introducing ammonia ($NH_3$) into the exhaust gas flow of an internal combustion engine for reducing nitrogen oxides ($NO_x$) contained in the exhaust gas flow on a SCR catalyst comprising a $NH_3$ source, a supply line for introducing the $NH_3$ into the exhaust gas flow and a dosing device.

Apart from carbon monoxide (CO) and hydrocarbons (HC), in particular the nitrogen oxides ($NO_x$) are among the environmentally harmful, directly emitted, primary injurious substances which are generated during the operation of internal combustion engines, in particular Diesel engines. The use of three-way catalysts, such as are used in Otto engines and gas engines, cannot be used in the exhaust of Diesel engines due to an oxygen excess. For this reason, for the reduction of the nitrogen oxide emission in Diesel engines a selectively operating SCR (Selective Catalytic Reduction) catalyst has been developed in which, in the presence of an added reducing agent, namely ammonia ($NH_3$), the expelled nitrogen oxides are reduced to $N_2$ and $H_2O$.

This type of reducing nitrogen oxide emissions in stationary Diesel engines has been found to be useful. In these stationary installations in the exhaust gas system of the internal combustion engine is disposed a SCR catalyst and the $NH_3$ to be added to the exhaust gas flow before the SCR catalyst is added by injection. In such installations the $NH_3$ is supplied in the form of a gas or aqueous solution. In the case in which $NH_3$ is supplied as an aqueous solution, a thermolytic splitting takes place in the exhaust gas flow, or in the SCR catalyst, in order to release the $NH_3$ necessary for the reduction of nitrogen oxides. The introduction of the reducing agent takes place via a dosing device which is adjusted as a function of the anticipated $NO_x$ quantity in the exhaust gas flow of the Diesel unit. When using $NH_3$ either as the gas or as aqueous solution, the use of skilled personnel is required since associating with these substances is not without danger with respect to their handling as well as also with respect to their toxicity.

Due to the not undangerous association with $NH_3$ in gaseous form or as an aqueous solution, it has become customary to provide the $NH_3$ required for the $NO_x$ reduction by introducing aqueous urea solution into the exhaust gas flow. The thermohydrolytic splitting with the liberation of $NH_3$ as reducing agent takes place through the heat of the exhaust gas flow or of the catalyst. In addition to the difficulties relating to the process of the unchecked feed of this reducing agent in the form of an aerosol, a further disadvantage entailed in obtaining $NH_3$ in this way is the formation of undesirable byproducts such as, for example, isocyanic acid. The fact that the freezing point of such a reducing agent is approximately $-13°$ C., moreover, stands in the way of using aqueous urea solutions for the $NO_x$ reduction of Diesel engine exhaust gases in mobile units, for example in utility vehicles or passenger motor vehicles. The winter-worthy use of this reducing agent is therefore only possible by mixing in additives which decrease the freezing point. However, the conversion of these additives in the SCR catalyst can lead to the emission of undesirable secondary injurious substances.

It is furthermore necessary to carry along a relatively large quantity of aqueous urea solution since the urea necessary for the reduction is only present in the aqueous solution at a ratio of at best 1:3 with respect to the $H_2O$.

The use of $NH_3$ carried along in pressure tanks or as aqueous solution for removing nitrogen in mobile Diesel units is not possible in the event of an accident due to the danger inherent in these substances.

From DE 34 22 175 A1 as well as DE 42 00 514 A1 processes are known which relate to the "just-in-time" production of $NH_3$ for the reduction of $NO_x$. The superior concept evident in these patents comprises using specific substances which thermolytically split off $NH_3$, the handling and toxicity of which are quite safe, in order to split off the required quantity of $NH_3$ in accordance with the particular requirements and to inject it into the exhaust gas flow. The generation of $NH_3$ takes place by heating such an $NH_3$-splitting compound, for example ammonium carbamate. The adaptation to the particular operating state of the motor, as described in DE 34 22 175 A1, takes place thereby that by controlling the calorific power, which for example acts on the carbamate, the $NH_3$ generation and thus the $NH_3$ quantity added to the exhaust gas flow can be regulated.

Such a regulatable $NH_3$ generator comprises essentially a storage tank for the compound splitting off $NH_3$, a decomposition chamber in which the action of the heat takes place, as well as a takeout line or supply line for the $NH_3$-containing gas. For heating the decomposition chamber, in particular electric heating [systems], for example resistance heating bodies or infrared radiators are provided.

The use of this prior known process or this prior known device is suitable for stationary installations which in general are only subject to few load changes and even then only to predetermined load changes, however, for deployment in mobile use, such as for example in utility vehicles or passenger vehicles, the use of this prior known technology is not appropriate since the reaction time of the system is too slow and thus the system too inert in order to be able to do justice to the unexpected motor load changes occurring in rapid succession in street traffic with correspondingly varying $NO_x$ emissions. If the operating state of the motor is acquired at a specific time and, based on this acquisition, a specific $NH_3$ dosing is calculated, the substance splitting off the $NH_3$ must first be heated in order to produce the $NH_3$-gas mixture. However, in street traffic, in particular in city traffic, an engine is subject to continuous and unexpected load changes such that the quantity of $NH_3$ which is lastly introduced does not match the operating state of the engine which has changed in the meantime. If an insufficient quantity of $NH_3$ is introduced, the $NO_x$ reduction can only be carried out to a limited extent. If the $NH_3$ is introduced in excess, unconsumed $NH_3$ exits the catalyst.

SUMMARY OF THE INVENTION

Building on the discussed prior art, the invention is therefore based on the task of proposing a process as well as a device for the $NO_x$ reduction of exhaust gases of an internal combustion engine using a SCR catalyst, which is not only suitable for mobile application but with which the above listed disadvantages are avoided.

This task is solved according to the invention through a process according to the species thereby that the process comprises the following steps:

initial heating of a substance or substance mixture at ambient temperature and capable of thermolytically splitting off $NH_3$ disposed in a pressure-tight receptacle (converter) to that temperature range at which the splitting-off of $NH_3$ takes place (splitting-off temperature range), maintaining the splitting-off temperature range until an internal pressure builds up in the converter, intermediately storing the split-off $NH_3$ or $NH_3$-gas mixture and, after reaching a predetermined reduction gas pressure in the $NH_3$ storage, acquiring engine operating characteristics according to which the $NO_x$ content in the exhaust gas flow can be calculated, based on which characteristics subsequently the determination of the $NH_3$ dosing, necessary for the reduction of the calculated $NO_x$ content, takes place, injection of a predetermined dose of the stored $NH_3$ into the exhaust gas flow of the internal combustion engine with the last two process steps being repeated with optional frequency during the operation of the engine.

The task is further solved according to the invention thereby that as the $NH_3$ source a heatable pressure-tight converter is provided in which is disposed a substance or a substance mixture splitting off $NH_3$ thermolytically and that the dosing device is preceded by an $NH_3$ store for the intermediate storage of the $NH_3$ split off from the substance through the addition of heat, which dosing device is acted upon with control signals by a control unit processing the engine characteristics and determining on that basis the $NO_x$ output.

By providing a process which makes possible the use as $NH_3$ precursor of a substance or a substance mixture which, in terms of its handlability and its toxicity is unobjectionable, and which, by building up an internal pressure in the converter, utilizes the establishment of an equilibrium state for the termination (in time) of a further $NH_3$ splitting, a process is created with which only a specific $NH_3$ quantity is made available. At any given time a specific $NH_3$ quantity is therefore available which can be injected into the exhaust gas flow in order to reduce $NO_x$. The intermediately stored quantity of $NH_3$ is so small that even in the case of a hypothetical destruction of the converter in the event of an accident it can be classified as unobjectionable due to its rapid mixing with ambient air.

By acquiring the engine operating characteristics and, if appropriate, the concentrations of exhaust gas components, calculation of the $NO_x$ mass flow in the exhaust gas becomes possible and, based on it, the calculation of the $NH_3$ quantity. Since a sufficient quantity of $NH_3$ is intermediately stored, a process is created which permits the $NH_3$ output quasi-simultaneously with the $NH_3$ determination. The process according to the invention as well as the device according to the invention are therefor primarily suited for the $NO_x$ reduction of mobile Diesel units subject to unpredictable load changes.

The invention combines the advantages of introducing the $NH_3$ as gas into the exhaust gas flow, the carrying along of substances or substance mixtures which, with respect to their handling and toxicity are unobjectionable at ambient temperature, as well as making immediately available the required $NH_3$. The process according to the invention as well as the device according to the invention are suitable for use of substances, splitting off $NH_3$ substantially free of residues and decomposable thermolytically, such as for example ammonium carbamate ($NH_2CO_2NH_4$) as well as for the use of substances reversibly $NH_3$-absorbing/desorbing and thus splitting off $NH_3$ such as for example of an iron (II) ammine sulfate.

For the initial heating as well as for maintaining the splitting-off temperature range of the converter, heat generated during operation of the internal combustion engine, is used and it is useful to assign to the converter a heating coil which is connected in particular when using ammonium carbamate to the cooling water circulation of the internal combustion engine. During operation of the internal combustion engine, the cooling water is at a temperature between 80 and 110° C., which corresponds to an internal converter pressure of approximately 6.5–8 bars when attaining a state of equilibrium. The converter is therefore implemented so as to be suitably pressure-tight for operation at such internal pressures. It is advisable to take a safety margin into account.

An embodiment example provides that the intermediate storage of the split-off $NH_3$ takes place in the converter itself. In a further embodiment example as the intermediate store a separate $NH_3$ store is provided whose storage pressure is below the operating pressure of the converter.

For better dosing of the $NH_3$ quantity to be removed, the converter usefully comprises a pressure-reducing valve. As the dosing device usefully a timed valve is provided.

A further development provides that the maximum $NH_3$ dosing is slightly smaller than that $NH_3$ dosing determined to be optimal According to such an implementation it is avoided that, in spite of the quasi-simultaneous $NH_3$ introduction, upon an abrupt load change potentially non-converted $NH_3$ exits the rear side of the SCR catalyst. To a limited extent, an emission of excess $NH_3$ could also be reduced through an oxidation catalyst succeeding the SCR catalyst.

The converter comprising the substance splitting off $NH_3$ can be connectable by means of rapid fasteners to the heating means provided for heating and maintaining the temperature as well as to the $NH_3$ supply line. In this way the rapid exchange of the converter can be carried out, if the substance splitting off $NH_3$ contained therein or the substance mixture splitting off $NH_3$ contained therein is consumed. It is further possible to provide that the converter is comprised of a heating unit and a reaction receptacle with the reaction receptacle being detachable from the heating unit. The heating unit, connected for example to the cooling water circulation, remains in the motor vehicle such that only the reaction receptacle proper is exchangeable.

BRIEF DESCRIPTION OF THE DRAWINGS

In the following detailed description, reference will be made to the attached drawings in which.

DETAILED DESCRIPTION OF THE INVENTION

Figure 1:
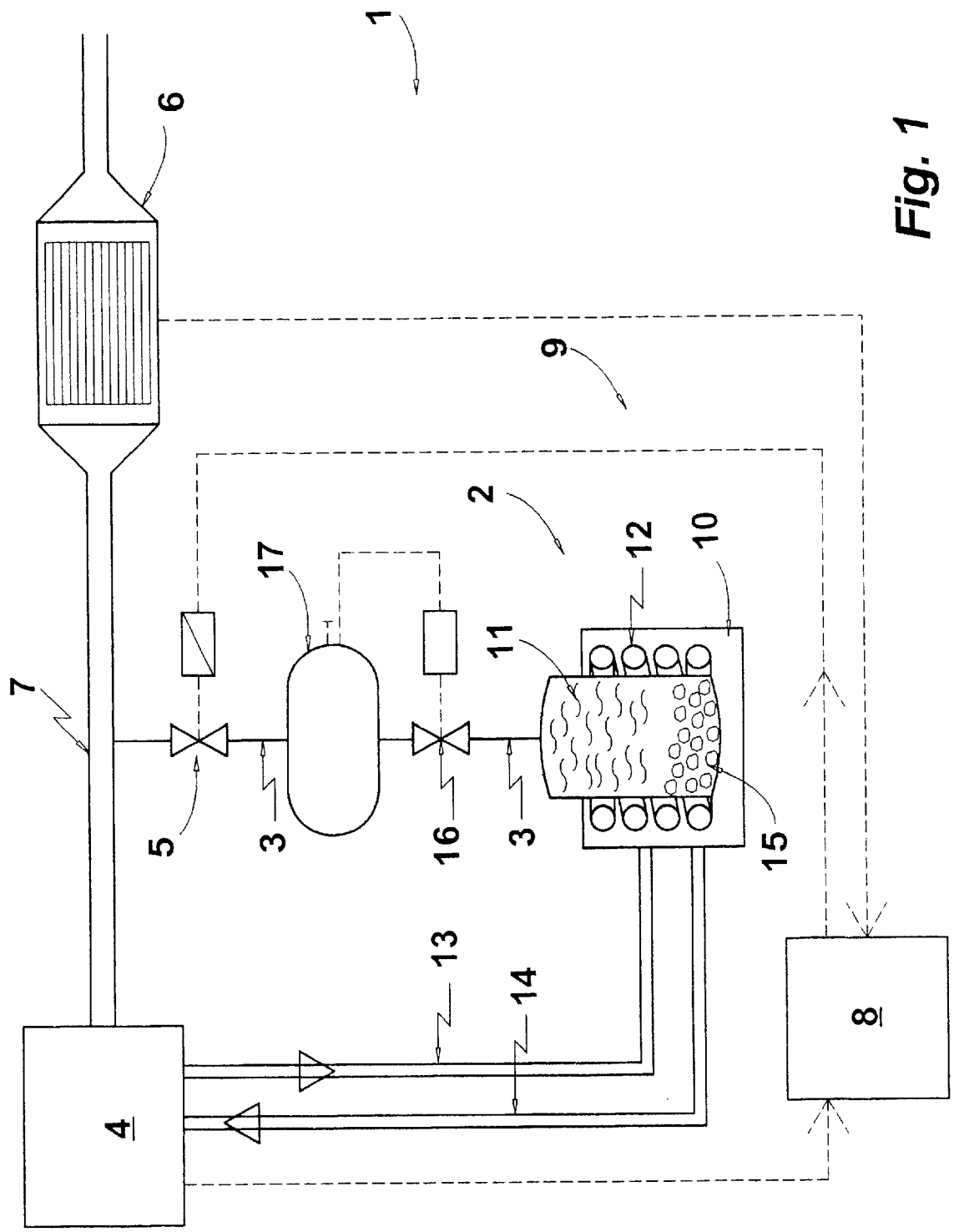
FIG. 1 is a schematic representation of a device of the present invention for introducing ammonia into the exhaust gas flow of an internal combustion engine for reducing nitrogen oxides contained in the exhaust gas flow.

The nitrogen-removal device 1 depicted schematically in FIG. 1 comprises a converter 2, a supply line 3 for introducing $NH_3$ into the exhaust gas flow 7 of a Diesel engine 4 and a timed valve 5 provided as a dosing device, as well as a SCR catalyst 6.

To control the timed valve 5 a memory-programmed control unit 8 is provided which is acted upon by signals of sensors receiving the engine operating characteristics as well as by signals of a sensor receiving the catalyst temperature. The control unit is connected at the output side via a control line 9 with the timed valve 5 such that the timed valve 5 is driven by the control unit 8.

The converter 2 comprises a heating unit 10 as well as a reaction receptacle 11. The heating unit 10 comprises a heating coil 12 which is integrated into the cooling water circulation of the Diesel engine 4 via a supply line 13 and an outlet line 14. During the operation of the Diesel engine 4 the cooling water flowing through the heating coil 12, as a rule, has a temperature between 80 and 100° C. which can potentially also increase up to 110° C. For the rapid heating of the heating unit 10 or of the reaction receptacle 11 contained therein, the supply and outlet lines 13, 14 are integrated into the so-called small cooling water circulation of the Diesel engine 4.

The reaction receptacle 11 is a pressure-tight receptacle into which a predetermined quantity of ammonium carbamate 15. has been introduced. The reaction receptacle 11 is closed pressure-tight. The reaction receptacle 11 depicted in FIG. 1 is closable such that after the consumption of the ammonium carbamate 15 it can be opened and newly filled.

By heating the ammonium carbamate 15 as a consequence of the flow through the heating unit 10 of, as a rule, cooling water of 80 to 100° C., the ammonium carbamate 15 is decomposed into $NH_3$.and carbon dioxide ($CO_2$). As is evident in the diagram represented in FIG. 2 the splitting-off temperature of the ammonium carbamate 15 starts at approximately 40° C.

Consequently, ammonium carbamate can be readily handled at ambient temperatures without special requirements being necessary with respect to handlability or toxicity of this substance. In the temperature range of 80 to 100° C., typical for cooling water temperatures of Diesel engines, thus the nearly complete decomposition of the ammonium carbamate 15 for the production of the reduction gas mixture comprising the $NH_3$ takes place.

Figure 2:
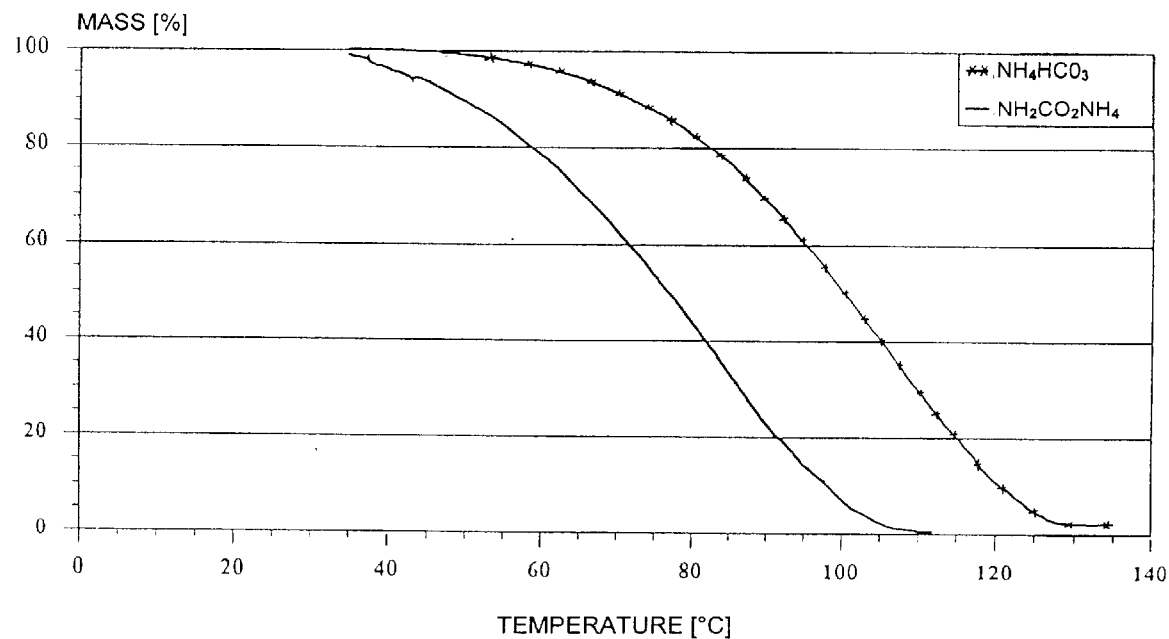
FIG. 2 is a diagram representing the decomposition of ammonium carbamate and ammonium hydrogen carbonate in the temperature range of 35 to 130° C.

Likewise, in FIG. 2 is also shown the decomposition of ammonium hydrogen carbonate—a further substance suitable for carrying out the invention, and it is evident that a decomposition of these substances splitting off $NH_3$ only starts at approximately 50° C. and that the complete decomposition occurs at approximately 130° C. Based thereon, it is evident that ammonium hydrogen carbonate can also be used for splitting off $NH_3$ under the cited conditions. However, for the effective utilization of the ammonium hydrogen carbonate it would be recommended to act upon the heating unit 10 with its heating coil 12 with a warmer medium, for example to integrate it into the oil circulation of the Diesel engine 4.

Figure 3:
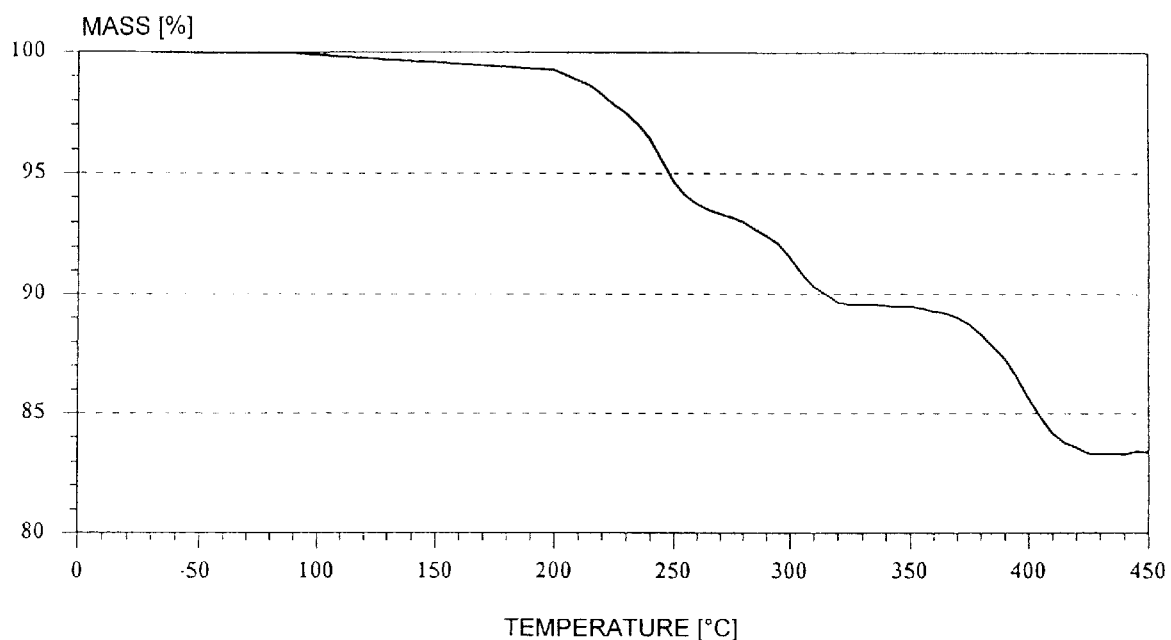
FIG. 3 is a diagram representing the decomposition of iron (II) triammine sulfate monohydrate in the temperature range of 30 to 450°C.

Corresponding to FIG. 2, FIG. 3 represents in a diagram the deammination of iron (II) triammine sulfate monohydrate. When using iron (II) triammine sulfate monohydrate as an example of an iron ammine sulfate a substance is being used which is reversibly $NH_3$ absorbing/desorbing. The use of such a substance can be useful since, compared to the two previously cited substances, upon heating exclusively $NH_3$ is split off; gaseous byproducts, such as for example $CO_2$, are not formed in this splitting off. During a reduction of the heat supply, such as for example when switching off the Diesel engine, the split-off $NH_3$ is bound again.

The reducing gases generated in the reaction receptacle 11—$NH_3$ and $CO_2$ in the embodiment example shown in FIG. 1 using ammonium carbamate 15—initially remain in the reaction receptacle 11.

With increasing decomposition of the ammonium carbamate 15 by maintaining the splitting-off temperature in the reaction receptacle 11, the internal pressure in it rises up to approximately 8 bars at a temperature of approximately 100° C. As a function of the internal temperature of the reaction receptacle 11 a state of equilibrium is established upon the cited internal pressure being reached such that no further ammonium carbamate 15 is decomposed. Thus, the reaction receptacle 11 also forms simultaneously an $NH_3$ store from which $NH_3$ can be drawn off as a portion of the gas mixture comprising $NH_3$ and $CO_2$. Drawing off a specific reduction quantity leads simultaneously to a reduction of the internal pressure in the reaction receptacle 11 such that the decomposition of further ammonium carbamate 15 leads to the splitting off of $NH_3$. The decomposition of additional ammonium carbamate 15 continues until said equilibrium state is established again. By utilizing the developing equilibrium state in the reaction receptacle 11 a means is created to stop the $NH_3$ production after a specific $NH_3$ quantity has been attained without requiring additional control mechanisms for this purpose.

The split-off $NH_3$ is removed from the reaction receptacle 11 via a pressure reducing valve 16 and supplied via the supply line 3 to the timed valve 5.

In FIG. 1 a further variant is shown in dashed lines, in which between the pressure reducing valve 16 and the timed valve 5 an additional separate $NH_3$ store 17 is provided. This $NH_3$ store 17 serves for the intermediate stock-pile of $NH_3$ and is laid out for an internal pressure of approximately 3.5 bars; this internal pressure is below the operating pressure of the converter 2. The output of the $NH_3$ store is connected to the input of the timed valve 5.

In a further development, not shown, with the reaction receptacle 11 or the $NH_3$ store 17 additionally a pressure sensor is associated whose special steel membrane, flush at the front, is directly in contact with the medium in the particular receptacle. With the aid of such a pressure sensor the internal pressure of the particular receptacle 11 or 17 can be acquired; the measurement signals of such a pressure sensor can be utilized for determining the remaining available ammonium carbamate quantity. If in the corresponding receptacle 11 or 17 a predetermined internal pressure does not build up in a given time interval, this permits a conclusion regarding the fact that only an insufficient ammonium carbamate as $NH_3$ precursor is available in the reaction receptacle 11. Such a state is subsequently indicated to the driver so that he can exchange the reaction receptacle 11 or the converter 2 for a newly filled one.

The device 1 for the nitrogen reduction functions in the following way:

After starting the Diesel engine 4 its small cooling water circulation is initially heated in a relatively short time to 80 to 100° C., potentially up to 110° C. By connecting the heating unit 10 with its heating coil 12 to the small cooling water circulation, thus after a brief time, the decomposition of the ammonium carbamate 15 in the reaction receptacle 11 into a gas mixture comprising $NH_3$ and $CO_2$ also starts. This decomposition or splitting process continues until the above addressed equilibrium state between the ammonium carbamate 15 and the decomposition gases—$NH_3$ and $CO_2$— has been established.

During operation of the Diesel engine 4 representative engine operating characteristics, based on which the $NO_x$ output can be determined, are acquired via sensors. These signals act upon the control unit 8. In the control unit 8 a determination of the $NO_x$ output of the Diesel engine 4 takes place and the determination of the correspondingly required $NH_3$ quantity for reduction of the output $NO_x$. The quantity of $NH_3$ intended for the reduction of the $NO_x$ is used in order to drive the timed valve 5 accordingly so that either directly from the reaction receptacle 11 or the $NH_3$ store 17 the required $NH_3$ dosing can be removed and injected into the exhaust gas system 7 before the SCR catalyst 6. Before the SCR catalyst 6 the injected gas mixture comprising $NH_3$ is already mixed with the $NO_x$—containing exhaust gas so that an effective reduction of the $NO_x$ can already take place upon the entry of this mixture of exhaust gas and reduction gas into the SCR catalyst 6.

Due to the direct conversion of the particular calculated $NO_x$ output, a corresponding supply of already available $NH_3$ is ensured such that even with rapid and unexpected load changes the supplied $NH_3$ dosing is appropriately dimensioned.

Figure 4:
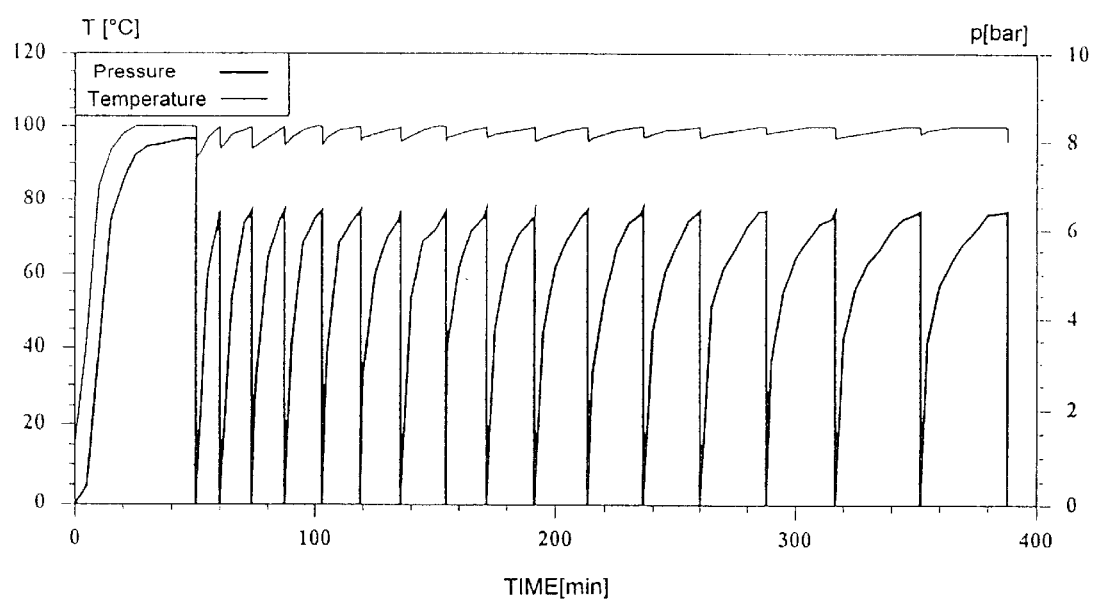
FIG. 4 is a diagram representing the pressure and temperature curve over time when using ammonium carbamate with repeated gas removal.

The pressure and temperature curve over time is depicted in FIG. 4 using ammonium carbamate 15 under repeated gas removal. It is evident in this diagram that the pressure build-up in the reaction receptacle 11 (in the example only 250 $cm^3$ content) in each instance is slightly lengthened over time due to the continuously decreasing ammonium carbamate quantity as $NH_3$ precursor. For the time utilization of a converter 2 filled with ammonium carbamate 15 the initial loading ratio $V_F/V_K$ is critical where $V_F$ is the solid volume of the ammonium carbamate and $V_K$ is the converter volume. In the diagram shown in FIG. 4 the initial loading ratio $V_F/V_K$ is only 0.2.

With the process according to the invention the $NO_x$ emissions of Diesel engines during mobile use can be reduced to below 0.4 g/km. If such an $NO_x$ output is attained, which is below the so-called Euro-III limit value, a filling of approximately 1 kg ammonium carbamate in a converter with three liter capacity is sufficient in order to reduce on a driving distance of 2000 km the $NO_x$ emission to below said limit value. In this example reference is made to a Diesel engine of 2 liter engine displacement. In correspondingly greater dimensioned converters an $NO_x$ reduction for approximately 10,000 driven kilometers could also be achieved such that the renewal intervals of a reaction receptacle 11 need only be carried out relatively rarely, for example at the interval of the oil changes.

What is claimed is:

1. Process for reducing nitrogen oxides ($NO_x$)on a SCR catalyst, disposed in an exhaust gas system of an internal combustion engine, with ammonia ($NH_3$) which is introduced before the catalyst into the exhaust gas flow, characterized in that the process comprises the following steps:

heating in a converter implemented as a pressure-tight receptacle an $NH_3$-containing substance, of which $NH_3$ can be thermolytically split off, to a temperature within a range at which the splitting-off of $NH_3$ takes place, the $NH_3$-containing substance being able to come to a state of equilibrium with the split-off $NH_3$ at a predetermined pressure within the converter, the converter being heated from heat generated during operation of the internal combustion engine;

maintaining the splitting-off temperature within the range for building an internal pressure in the converter up to a known internal pressure at which, without removal of the gas, the state of equilibrium is established between the temperature-conditioned $NH_3$ splitting substance and the split-off $NH_3$ so that the pressure in the converter does not rise while the splitting-off temperature is maintained;

intermediately storing within the converter a specific quantity of the split-off $NH_3$;

acquiring engine operating characteristics according to which the $NO_x$ content in the exhaust gas flow can be calculated and, based on the acquired engine operating characteristics, carrying out a determination of the $NH_3$ dosing necessary for reducing the calculated $NO_x$ content in the exhaust gas flow;

drawing off and injecting a predetermined dose of the intermediately stored $NH_3$ into the exhaust gas flow of the internal combustion engine with the last two process steps repeating at optional frequency during the operation of the engine such that due drawing off of the dose from the converter needed for the injecting into the exhaust gas flow the pressure in the converter drops and the state of equilibrium between the temperature-conditioned $NH_3$ and the split-off $NH_3$ in the converter is destabilized such that additional split-off $NH_3$ will thermolytically be produced from the $NH_3$-carrying substance contained in the converter.

2. Process as claimed in claim 1, characterized in that cooling water of the internal combustion engine is used for heating the converter as well as for maintaining the splitting-off temperature.

3. Process as claimed in claim 1, characterized in that the split-off $NH_3$ is also stored in an $NH_3$ storage succeeding the converter and gas-connected to it, wherein the $NH_3$ storage is kept at an essentially constant pressure which is below the maximum operating pressure provided in the converter.

4. Process as claimed in claim 1, characterized in that for determining the $NH_3$ supply in the converter signals of a pressure sensor disposed in the converter or in the $NH_3$ storage are used.

5. Process as claimed in claim 1, characterized in that a maximum $NH_3$ dosing is smaller than a stoichiometric $NH_3$ dosing determined as being optimal.

6. Process as claimed in claim 1, characterized in that as engine operating characteristics the engine speed and/or the load state and/or the boost pressure of a turbo-charger is acquired.

7. Process as claimed in claim 1, characterized in that as the substance splitting off $NH_3$ a substance which decomposes thermolytically free of residues is used.

8. Process as claimed in claim 7, characterized in that as the substance ammonium carbamate ($NH_2CO_2NH_4$) is used.

9. Process as claimed in claim 1, characterized in that as the substance splitting off $NH_3$ a reversibly $NH_3$ absorbing/desorbing substance is used.

* * * * *